(12) United States Patent
Devaureix et al.

(10) Patent No.: US 10,429,843 B1
(45) Date of Patent: Oct. 1, 2019

(54) PARAMETRIZABLE AUTOMATIC PILOTING SYSTEM INTENDED FOR AN AIRCRAFT

(71) Applicant: THALES, Neuilly-sur-Seine (FR)

(72) Inventors: Rodolphe Devaureix, Valence (FR); Arnaud Bonnafoux, Toulouse (FR); Jerome Birre, Bruguieres (FR)

(73) Assignee: THALES, Courbevoie (FR)

( * ) Notice: Subject to any disclaimer, the term of this patent is extended or adjusted under 35 U.S.C. 154(b) by 1923 days.

(21) Appl. No.: 13/869,413

(22) Filed: Apr. 24, 2013

(30) Foreign Application Priority Data

Apr. 24, 2012 (FR) .................................... 12 01201

(51) Int. Cl.
| | |
|---|---|
| *G05D 1/02* | (2006.01) |
| *G05D 1/00* | (2006.01) |
| *B64C 13/18* | (2006.01) |
| *B64C 19/00* | (2006.01) |
| *G08G 5/00* | (2006.01) |
| *G05D 3/00* | (2006.01) |

(52) U.S. Cl.
CPC ............. *G05D 1/0202* (2013.01); *G05D 1/00* (2013.01); *B64C 13/18* (2013.01); *B64C 19/00* (2013.01); *G05D 3/00* (2013.01); *G08G 5/00* (2013.01)

(58) Field of Classification Search
CPC .......... G05D 1/00; G05D 1/0202; G05D 3/00; B64C 13/18; B64C 19/00; G08G 5/00
See application file for complete search history.

(56) References Cited

U.S. PATENT DOCUMENTS

| | | | | | |
|---|---|---|---|---|---|
| 5,301,112 | A | * | 4/1994 | Gold | .................... G05D 1/0858 244/17.13 |
| 5,510,991 | A | | 4/1996 | Pierson et al. | |
| 5,785,281 | A | * | 7/1998 | Peter | ..................... G01S 5/0027 244/190 |
| 6,334,344 | B1 | | 1/2002 | Bonhoure et al. | |
| 6,507,776 | B1 | * | 1/2003 | Fox, III | ............... G05D 1/0055 244/180 |
| 8,380,424 | B2 | * | 2/2013 | Bushnell | .............. G01C 23/005 340/961 |
| 8,554,458 | B2 | * | 10/2013 | Sawhill | ................ G08G 5/0013 701/120 |

(Continued)

FOREIGN PATENT DOCUMENTS

| | | |
|---|---|---|
| EP | 0628898 A1 | 12/1994 |
| FR | 2787587 A1 | 6/2000 |
| FR | 2841999 A1 | 1/2004 |

*Primary Examiner* — Tyler J Lee

(74) *Attorney, Agent, or Firm* — Baker & Hostetler LLP

(57) ABSTRACT

An automatic piloting system intended for an aircraft comprising an aircraft signals acquisition module, a module for interfacing with the crew, and a module for processing the output signals, comprises: a generic software kernel for automatic piloting aboard the aircraft, comprising several parameterizable elementary cells, a parameterization tool for the generic software kernel, able to transform an operational need of the automatic piloting system, expressed by means of a configuration file in accordance with a predetermined configuration domain DC, into a database of binary parameters DB able to parameterize the generic software kernel; each cell being parameterized by the database DB, and means for loading and storage aboard the aircraft of the database DB.

18 Claims, 5 Drawing Sheets

(56) References Cited

U.S. PATENT DOCUMENTS

| | | | |
|---|---|---|---|
| 9,176,926 B2 * | 11/2015 | Lacaille | G05B 23/0221 |
| 2006/0059497 A1 | 3/2006 | Leriche et al. | |
| 2009/0088972 A1 * | 4/2009 | Bushnell | G01C 23/005 |
| | | | 701/414 |

* cited by examiner

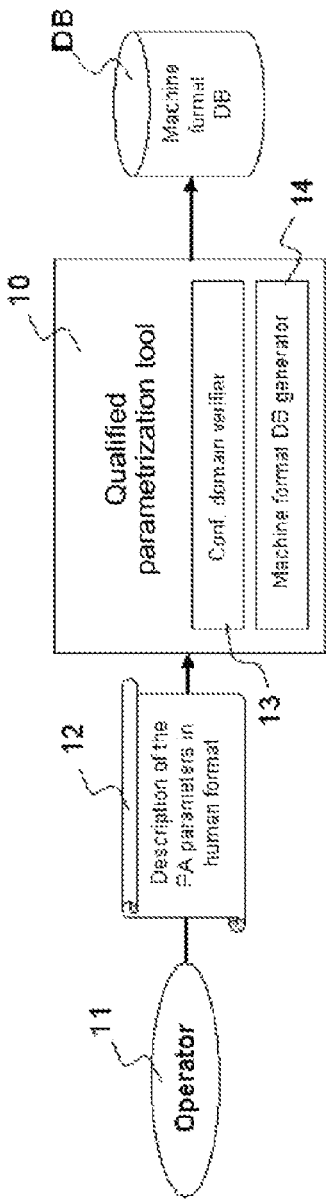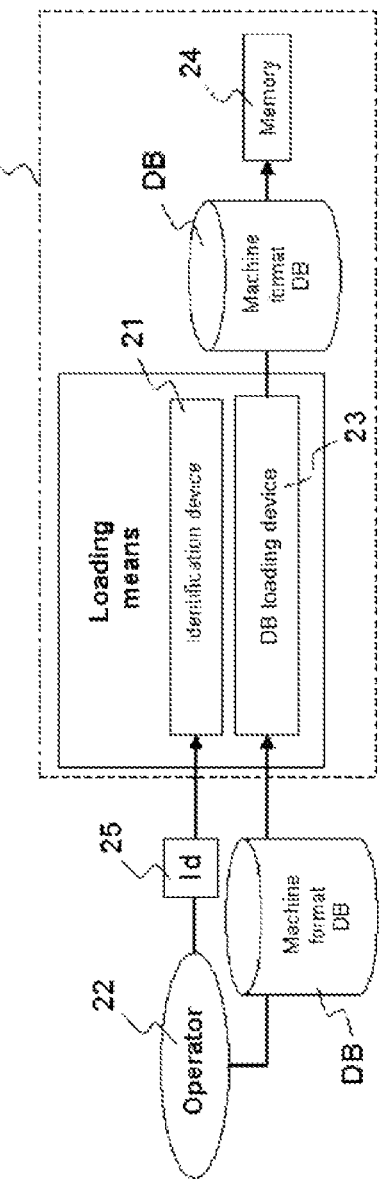

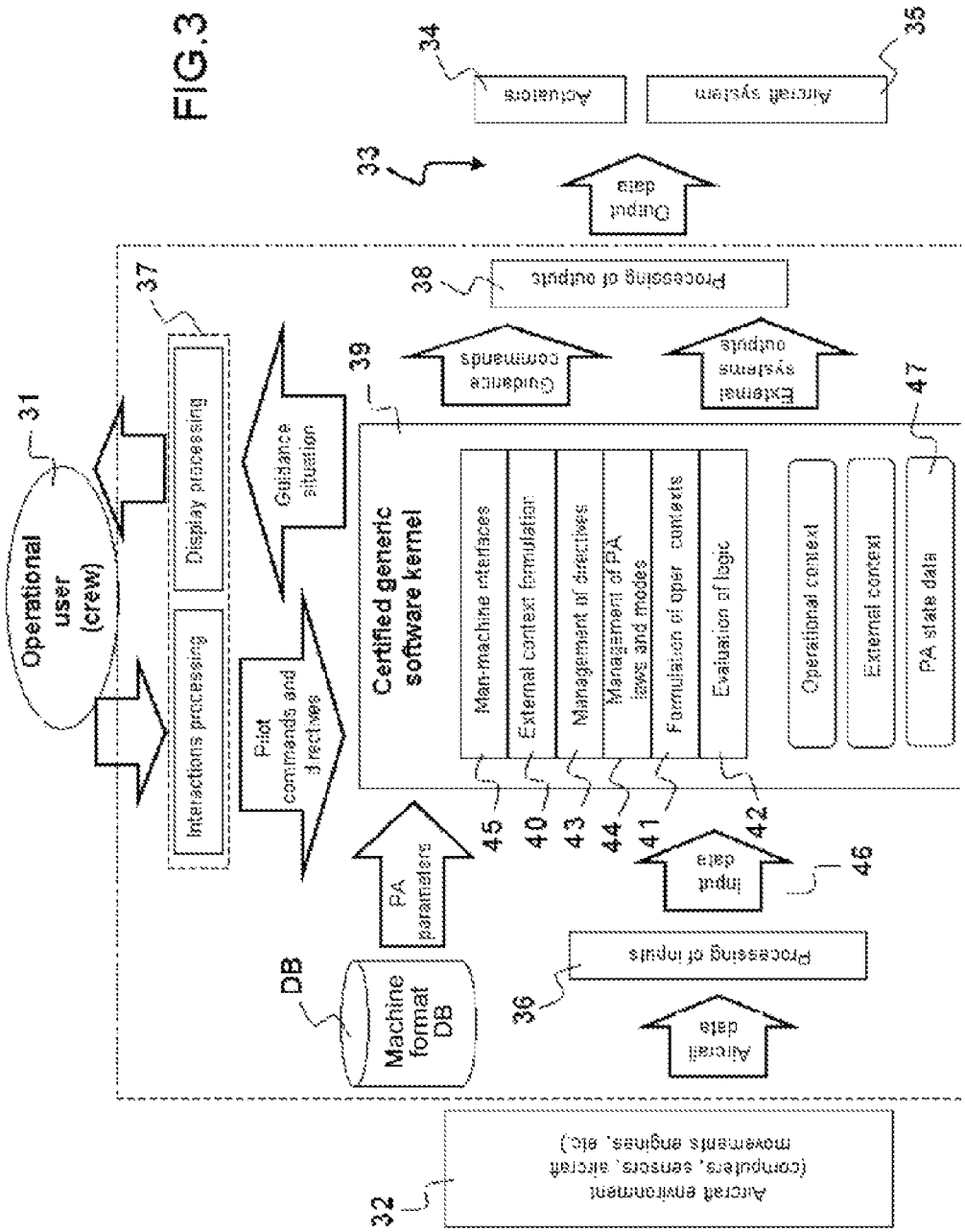

PARAMETRIZABLE AUTOMATIC PILOTING SYSTEM INTENDED FOR AN AIRCRAFT

CROSS-REFERENCE TO RELATED APPLICATIONS

This application claims priority to foreign French patent application No. FR 1201201, filed on Apr. 24, 2012.

FIELD OF THE INVENTION

The present invention belongs to the field of automatic piloting systems onboard aircraft. More precisely, it applies to automatic piloting systems which carry out the guidance of an aircraft in accordance with the pilot's directives and informs the crew about the situation of the guidance.

BACKGROUND

An automatic piloting system (PA) makes it possible to automatically accomplish a set of more or less complex activities that previously used to be carried out manually by the pilot. By advocating manoeuvres suited to the conditions and to the flight plan, it helps to lighten the pilot's load. The development and maintenance of such systems are complex and expensive since they depend not only on the technical specifications of the aircraft equipment but also on the operational customs and procedures of aircraft manufacturers. The maturity of the expression of the aircraft manufacturer's need, in terms of defining the behaviour of the PA, progresses during the course of the development of an aircraft. As long as the expression of the need has not come to an end, the design of an automatic piloting system is faced with numerous iterations of software development, sometimes up until in-flight trials and beyond commissioning into service. Moreover, the software of an automatic piloting system must be certified. The certification process consists in providing an organization with proofs related to the software development activities in order to obtain certification credits for all or part of the software. As the behaviour of the automatic piloting system depends on the specific need of an aircraft manufacturer, interfaced systems and aerodynamic parameters specific to the carrier, the software of an automatic piloting system must be modified or redeveloped for each particular aircraft.

The automatic piloting systems of the prior art which exhibit the characteristic of being developed specifically (without gaining certification credit from the previous developments) as a monolithic sequential code require iterations which are lengthy, expensive and uncertain in terms of timescale. Regular software updates may be necessary during development, and during the phase of commercial operations when the aircraft manufacturer requests modification or addition of new automatic piloting functions. Under the conditions of the prior art, any modification involves repeating all or part of the software certification process.

SUMMARY OF THE INVENTION

To solve these difficulties, the general idea of the invention is to structure the automatic piloting system by isolating on the one hand a generic software kernel which constitutes an invariant part and which is certified and from which it will be possible to gain credit, and on the other hand a configurable variable part making it possible to adapt the automatic piloting system to alterations in the operational needs of the aircraft, during development or operations, this configurable variable part not needing to be certified.

For this purpose, the subject of the invention is an automatic piloting system intended for an aircraft comprising an aircraft signals acquisition module, a module for interfacing with the crew, and a module for processing the output signals, characterized in that it furthermore comprises:
  a generic software kernel for automatic piloting aboard the aircraft, comprising several parameterizable elementary cells,
  a parameterization tool for the generic software kernel, able to transform an operational need of the automatic piloting system, expressed by means of a configuration file consisting of a set of parameters structured in accordance with a predetermined configuration domain DC, into a database of binary parameters DB able to parameterize the generic software kernel; each cell being parameterized by the database DB,
  means for loading and storage aboard the aircraft, of the database DB.

The invention also pertains to a method of automatic piloting aboard an aircraft comprising a step of acquiring aircraft signals, a step of interacting with the crew, and a step of processing output signals, characterized in that it furthermore comprises calculation steps parameterizable by means of a database of binary parameters DB for:
  Formulating an external context, by means of a set of variables representative of conditions exterior to the automatic piloting system, generated on the basis of the aircraft signals;
  Formulating an operational context, by means of a set of variables representative of operational conditions internal to the automatic piloting system, generated on the basis of aircraft signals or of external-context variables;
  Formulating execution logic for the automatic piloting system, at least as a function of an operational-context variable;
  Managing piloting or guidance directives issued by the pilot or the automatic piloting system;
  Managing piloting or guidance laws and modes.

The invention also pertains to an automatic piloting system intended for an aircraft having the characteristics defined above, characterized in that it comprises a step of defining a configuration domain DC, the said configuration domain DC being able by parameterization to cover a wide spectrum of operational needs of the automatic piloting system, and a step of programming and certifying several generic software engines.

The invention also pertains to a method of maintenance of a piloting system intended for an aircraft having the characteristics defined above, characterized in that it comprises a step of identifying a user logging on to the automatic piloting system, a step of loading a database of binary parameters DB for the parameterization of a generic software kernel, and a step of storage aboard the aircraft; the automatic piloting system being able in operational configuration to read the binary parameters of the database DB.

The invention finally pertains to a program product comprising code instructions making it possible to perform the steps of the automatic piloting method having the characteristics defined above.

BRIEF DESCRIPTION OF THE DRAWING

The invention will be better understood and other advantages will become apparent on reading the detailed description of the embodiments given by way of example in the following figures:

FIG. 1 represents the simplified functional architecture of a parameterization tool for an automatic piloting system according to the invention, FIG. 2 represents the simplified functional architecture of means for loading and storage of a database of parameters for an automatic piloting system aboard an aircraft, FIG. 3 represents the simplified functional architecture and the relationships of an automatic piloting system comprising a generic software kernel according to the invention, FIG. 4 describes the steps of a method for formulating a set of external-context variables according to the invention, FIG. 5 describes the steps of a method for formulating a set of operational-context variables according to the invention.

For the sake of clarity, the same elements will bear the same labels in the various figures.

DETAILED DESCRIPTION

Figure 4:
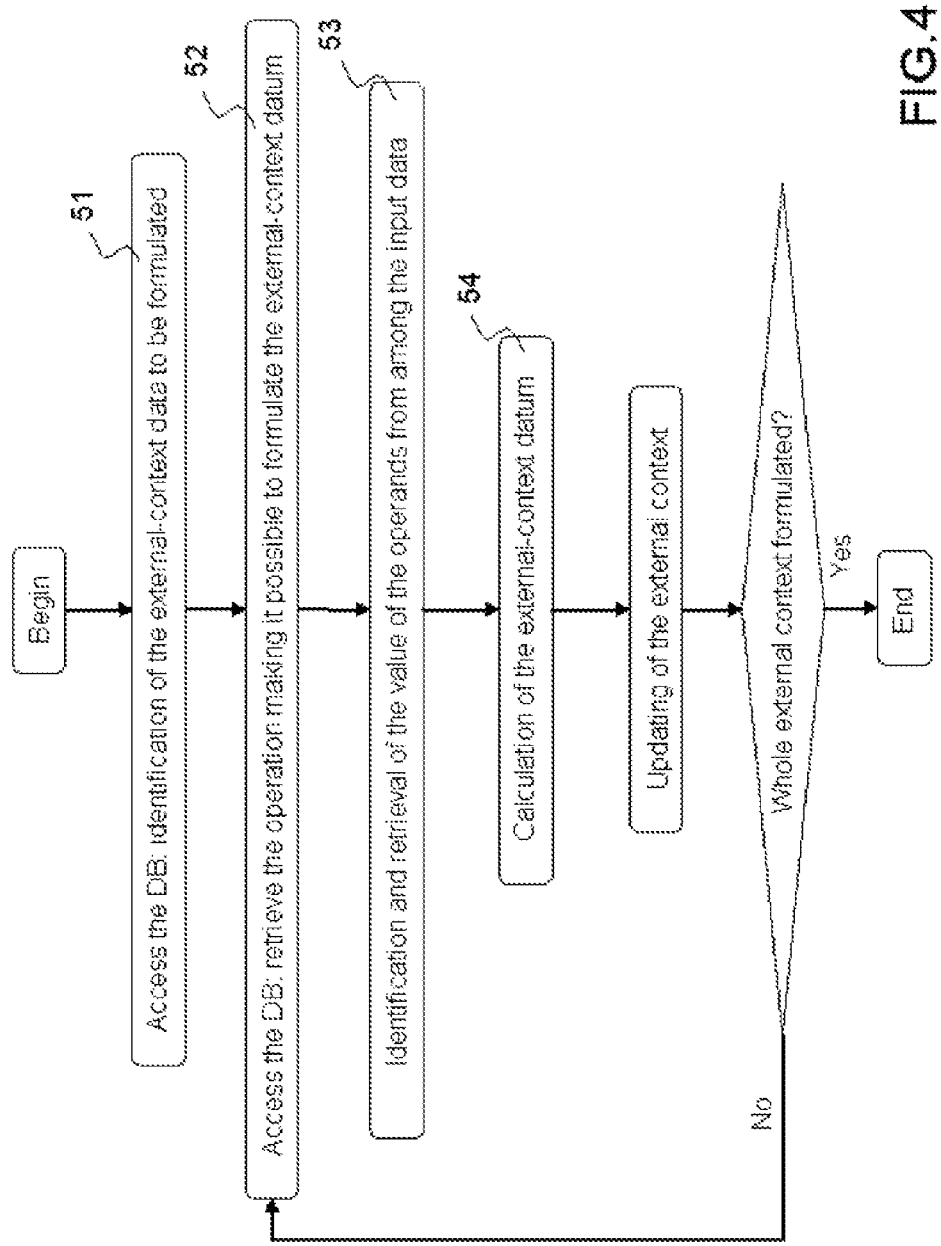

FIG. 1 represents the simplified functional architecture of a parameterization tool for an automatic piloting system. According to the invention, a qualified parameterization tool 10 allows an operator 11 to generate a database DB in the machine format. The operator 11 provides as input to the parameterization tool 10 a configuration file 12 containing the variable parameters of the automatic piloting system, or PA system, which are peculiar to the characteristics of the aircraft, to the specific need of the aircraft manufacturer, to technical constraints of the PA system, to constraints of interaction and display destined for the crew, or to input and output constraints of the PA system. The content of the configuration file 12 is humanly comprehensible; several formats are possible for the configuration file 12, and notably XML, HTML, XHTML, LaTeX or any other structured text format. The structure of the content of the configuration file 12 is constrained by a configuration domain DC. The parameterization tool 10 comprises a first module 13 for verifying the configuration domain DC of the configuration file 12, and a second module 14 for converting the configuration file 12 into a database of binary parameters DB. Stated otherwise, the parameterization tool 10 is designed to make it possible to verify the conformity of the parameters contained in the configuration file 12 with respect to the configuration domain DC, before converting the said configuration file into a database of binary parameters DB. The fact that the parameterization tool 10 is qualified implies that the machine code generated for the database DB is not subjected to obtaining of certification credits.

According to the invention, the configuration file describes an operational need by means of a set of parameters structured in accordance with a configuration domain DC, the said configuration domain DC consisting at least of the definition of the guidance modes. Each guidance mode is described by a list of parameters comprising at least one type of guidance mode, activation logic, an activation event, a guidance law, a guidance directive, or a piloting configuration. With each parameter is associated a range of permitted values.

FIG. 2 represents the simplified functional architecture of means for loading and storage of a database of parameters for an onboard automatic piloting system aboard an aircraft. According to the invention, the storage and loading means 20 comprise a device 21 for identifying a user 22 logging on to the automatic piloting system, a database DB loading device 23 and a memory device 24 for the storage of the database DB.

The identification device 21 allows a user 22, for example a maintenance operator, to identify himself with the aid of an identification medium 25 in order to open a database DB loading session. Several types of identification media 25 are envisaged according to the invention, for example a chip card, a contactless card, a USB peripheral or any other removable storage peripheral. Likewise, media for biometric identification, associated with physiological information characteristic of the user 22, such as, for example, fingerprints, a facial recognition, a DNA recognition, a geometry of the hand, a palmar recognition, a retinal recognition or a recognition of the iris are envisaged.

After identification of the user 22, the loading of a database DB can be carried out by wire-based connection by means of transfer protocols such as FTP, TFTP or any other data transfer protocol, or else by wireless connection for example of Wifi type, or else again by physical connection via a removable support of USB or CD-ROM medium type or any other memory support.

Finally, the database DB is stored aboard the aircraft by means for example of a physical medium such as hard disk, USB key or CD-ROM, or else by means of a memory device of RAM or FLASH memory type.

FIG. 3 represents the simplified functional architecture and the relationships of an automatic piloting system comprising a generic software kernel. The onboard automatic piloting system aboard an aircraft ensures the guidance of an aircraft as a function of directives of the crew 31; on the basis of a set of aircraft signals 32, the PA system defines a set of piloting directives 33 transmitted to components 34 or sub-systems 35 of the aircraft. According to the invention, the PA system comprises an aircraft signals acquisition module 36, a module 37 for interfacing with the crew, a module for processing the output signals 38 and a generic software kernel 39.

According to the invention, the generic software kernel 39 is designed so as to be able to be parameterized by means of the database of binary parameters DB, defined for a predetermined configuration domain DC, such as described hereinabove. A new operational need, described by a configuration file 12 in accordance with the configuration domain DC for which the generic software kernel 39 was initially developed, can be taken into account in the course of the development or operation of the aircraft, by performing an update of the database DB stored in the PA system.

The software kernel 39 comprises several parameterizable elementary cells, and notably:

- a first cell 40 for formulating a set of external-context variables,
- a second cell 41 for formulating a set of operational-context variables,
- a third cell 42 for formulating execution logic for the automatic piloting system, at least as a function of an operational-context variable,
- a fourth cell 43 for managing guidance directives provided by the pilot or the automatic piloting system,
- a fifth cell 44 for managing guidance laws and modes of the automatic piloting system.

Advantageously, each of the cells comprises a software engine parameterizable by the database of binary parameters DB. The structuring of a configuration domain DC, and the slicing into parameterizable elementary cells driven by generic software engines makes it possible advantageously to isolate the invariant parts of the PA system. It becomes possible to factorize the set of code lines of the software. The invariant parts which depend for example on hardware configurations of components common to a set of aircraft or which depend on regulatory execution logic are isolated from the parameterizable variable parts. The operational conditions of employment peculiar to an aircraft manufacturer, such as for example the content of guidance procedures, are processed as bundled parameters in a configuration file 12.

Advantageously, the software kernel 39 furthermore comprises a cell 45 for managing the MMI interface, able to adapt the MMI interface at least as a function of an external-context or operational-context variable. Typically, the cell 45 for managing the MMI interface makes it possible to manage several types of media for interaction, for example control panel or touchscreen, and for display, for example PFD, FMA or LCD screen. During working operations, the information to be displayed to the operational user 31 are known and can be characterized by qualitative properties such as the default colour, the colour in a particular context, the frequency of information updating, or the visibility of the information as a function of a particular context. The PA system is designed to retrieve these characteristics from the database DB in order to adapt the display as a function of the parameters retrieved or of the context. For example, when the context associated with an item of information changes, the MMI management cell 45 retrieves from the database DB the parameters corresponding to the item of information and to the new context, and then updates the properties of the item of information accordingly. The set of information constantly updated by the MMI constitutes the guidance situation displayed to the operational user 31. Likewise, certain information originating from the user 31 such as commands and directive, transmitted to the generic kernel 39, can have parameterizable variant properties such as a priority or a precision. The PA is designed to retrieve the set of these properties from the database DB so as to adapt the behaviour of the PA as a function of the parameters contained in the database DB.

The invention also pertains to a method of automatic piloting aboard an aircraft comprising a step of acquiring aircraft signals, a step of interacting with the crew, and a step of processing output signals, characterized in that it furthermore comprises parameterizable calculation steps for:

Formulating an external context, by means of a set of variables representative of conditions exterior to the automatic piloting system, generated on the basis of the aircraft signals;

Formulating an operational context, by means of a set of variables representative of operational conditions internal to the automatic piloting system, generated on the basis of aircraft signals or of external-context variables;

Formulating execution logic for the automatic piloting system, by associating with an activation event, at least one external or operational context and with an activation type;

Managing piloting or guidance directives commanded by the pilot or calculated by the automatic piloting system on the basis of an activation event, for a given context;

Managing piloting or guidance laws and modes, by means of a set of guidance segments which is associated with at least one activation logic, a piloting configuration, or a guidance dynamics.

FIG. 4 describes the steps of a method for formulating a set of external-context variables according to the invention. These external-context variables, which can be of various types, for example integer, decimal, or boolean, are established on the basis of input data 46 consolidated by the acquisition module 36 on the basis of aircraft signals 32.

The nature and the number of external-context variables formulated in this step is variable and depends on the aircraft and the aircraft manufacturer's need. The PA system is therefore designed so that the number and the nature of these external-context variables is parameterized in the database DB. The database DB also contains the parameterization information defining, for each external-context variable, the mathematical operation which makes it possible to formulate it, that is to say the operands and the operators. For each external-context variable, the PA system accesses the database DB to extract the information which makes it possible to formulate this variable, i.e. the mathematical operation consisting of the various operands and operators. The structure of the possible mathematical operations for the formulation of the external context is constrained by the configuration domain.

Moreover:

The operands are input data 46 arising from the aircraft signals 32 acquisition module 36. The PA system offers a mechanism making it possible to identify, from among the input data 46, those which may be operands for constructing the external context. For example, the input data 46 concerned may be associated with a single identifier making it possible to reference them as operand in the database DB;

The mathematical operations may be of various types, constraining the type of the operators and operands:

Boolean equations: the operands are boolean data and the operators are logical AND and logical OR, Numerical equation: the operands are numerical values, for example integers or decimals, and the operators may be mathematical comparators such as >, <, or threshold operators such as MIN, which determines the smaller of two values, and MAX, which determines the larger of two values.

Thus, as described in FIG. 4, the external-context formulating step comprises the calculation steps consisting in:

Identifying in a step 51 external-context variables to be formulated, such as specified in a database of binary parameters DB, For each external-context variable:

Identifying in a step 52 a mathematical operation, specified in the database DB, making it possible to formulate the external-context variable, Identifying in a step 53 values of aircraft signals necessary for the mathematical operation, Calculating in a step 54 the external-context variable, by means of the mathematical operation and of the values of aircraft signals.

Figure 5:
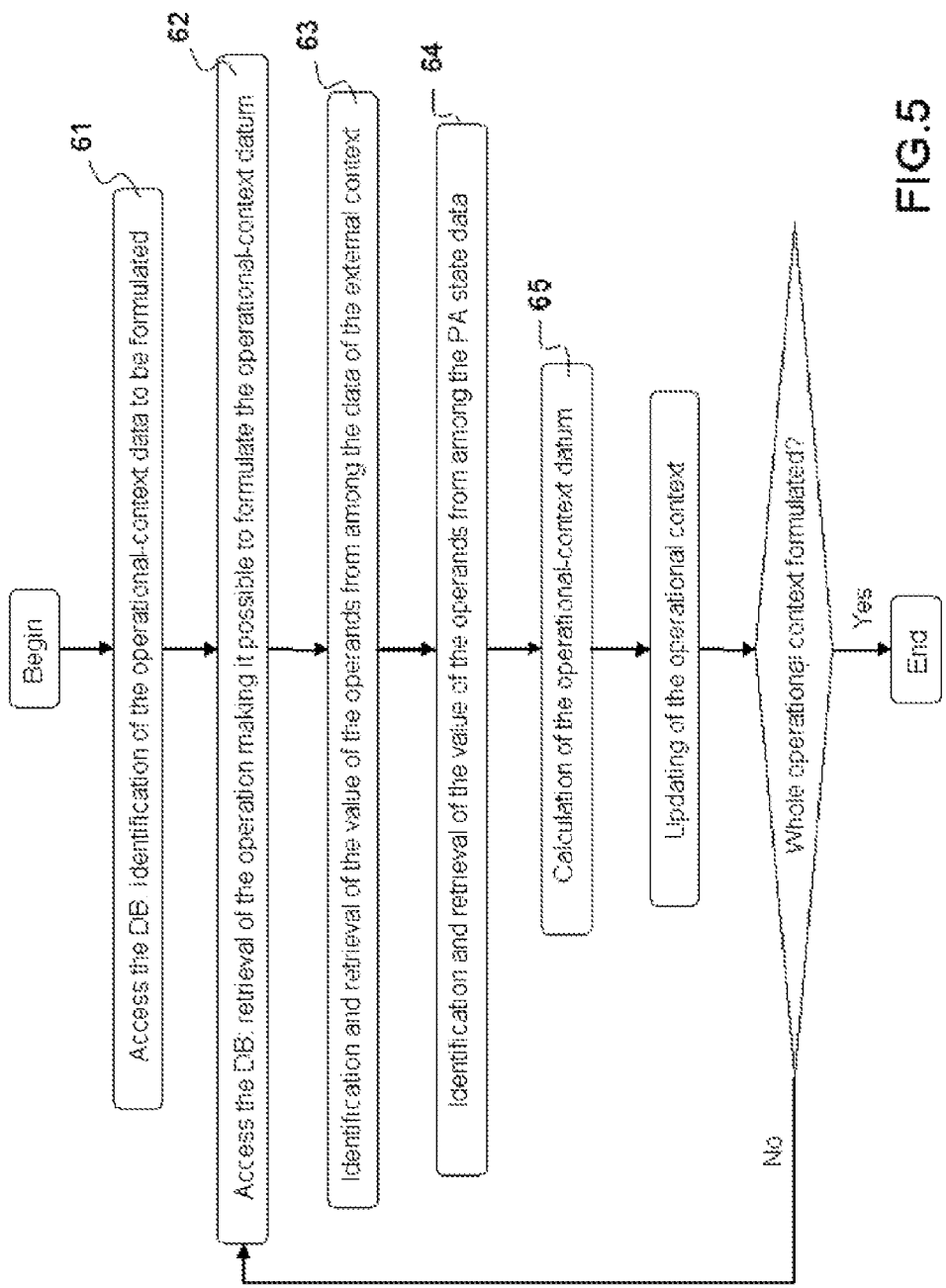

FIG. 5 describes the steps of a method for formulating a set of operational-context variables according to the invention. These operational-context variables are boolean variables established on the basis of the input data 46 arising from the acquisition module 36, external-context variables, and data of the internal state of the PA.

The nature and the number of operational-context variables depend on the aircraft and the aircraft manufacturer's need. The PA system is therefore designed so that the number and the nature of these operational-context variables are parameterized in the database DB. The database DB also contains the parameterization information defining, for each operational-context variable, the mathematical operation which makes it possible to formulate it, that is to say the operands and the operators.

The PA is designed to periodically formulate the operational context. The structure of the possible operations for the formulation of the operational context is constrained by the configuration domain:

the operands are external-context variables and data of the internal state of the PA. The PA system offers a mechanism making it possible to identify, from among the data of the internal state of the PA, those which may be operands for constructing the operational context. For example, the relevant data of the internal state of the PA may be associated with a single identifier making it possible to reference them as operand;

The mathematical operations may be of various types, constraining the type of the operators and operands:

Boolean equations: the operands are boolean data and the operators are logical AND and logical OR, Numerical equation: the operands are numerical values, for example integers or decimals, and the operators may be mathematical comparators such as $>$, $<$, or threshold operators such as MIN, which determines the smaller of two values, and MAX, which determines the larger of two values.

Thus, as described in FIG. 5, the operational-context formulating step comprises the calculation steps consisting in:

Identifying in a step 61 operational-context variables to be formulated, such as specified in a database of binary parameters DB, For each operational-context variable:

Identifying in a step 62 a mathematical operation, specified in the database DB, making it possible to formulate the operational-context variable, Identifying in steps 63 and 64 values of external-context variables and of data of the internal state of the PA, which are necessary for the mathematical operation, Calculating in a step 65 the operational-context variable, by means of the mathematical operation and of the values of aircraft signals and external-context variables.

Figure 6:
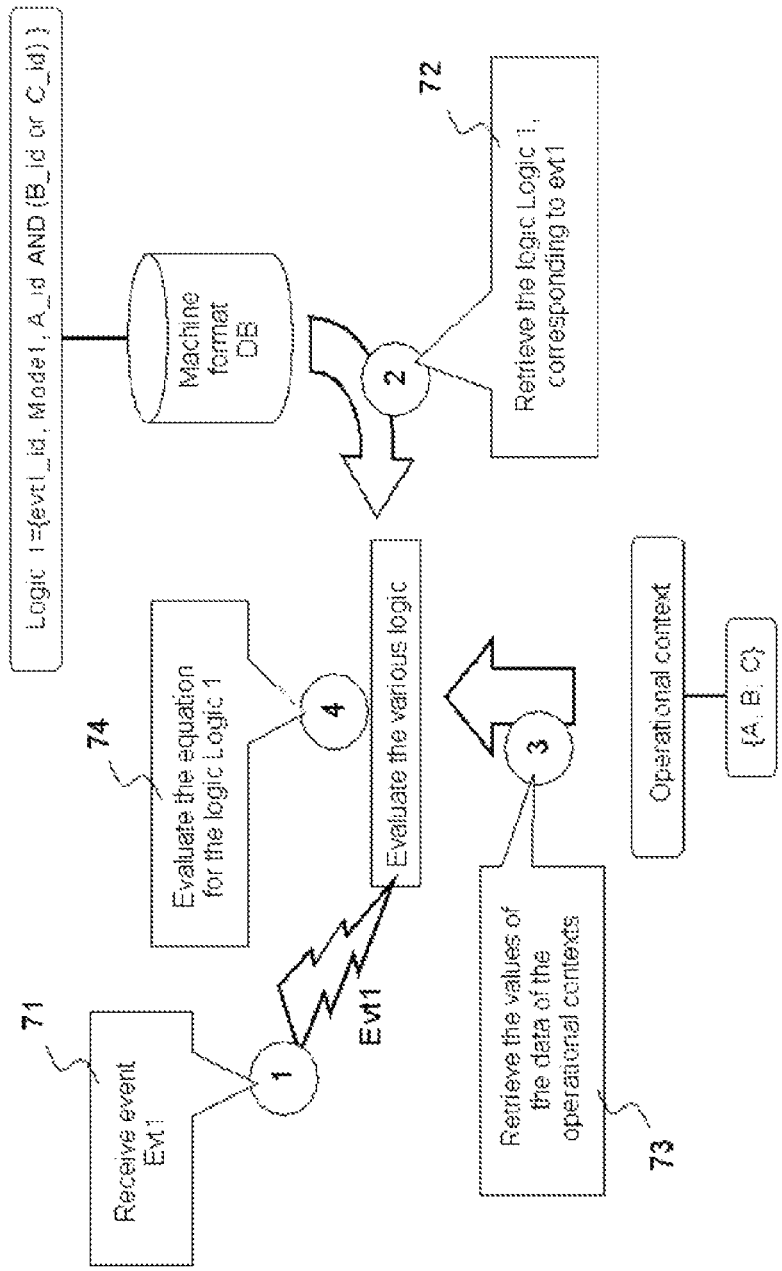
FIG. 6 illustrates the principle of a method for calculating execution logic for the automatic piloting system.

FIG. 6 illustrates the principle of a method for calculating execution logic for the automatic piloting system. According to the invention, an execution logic can be the association of an event and of a boolean operation the operands of which may be variables of the operational context and the operators of which may be operators such as logical AND and logical OR. The various execution logic depends on the aircraft and on the aircraft manufacturer's need. The PA system is designed so that the execution logic is parameterized in the database DB, that is to say the database DB can reference events of the PA system and variables of the operational context, in the guise of operands of boolean operations. The PA system offers a mechanism making it possible to identify the events and a mechanism making it possible to reference the variables of the operational context. These mechanisms can be carried out by a unique identifier associated with the events, with the variables of the operational context or with any other item of data that can help to define an execution logic. The form of the execution logic is constrained by the configuration domain DC. When an event is received by the PA system, such as a command of the operational user 31, the PA system is designed so that the step of formulating the execution logic accesses the database DB to search for all the various logic associated with this event. For each logic found, the boolean operation of the logic is evaluated.

As represented in FIG. 6, the calculation of execution logic comprises:

A step 71 of receiving an activation event

A step 72 of identifying a set of execution logic associated with this activation event, specified in the database DB, For each execution logic associated with the activation event:

A step 73 of identifying the values of operational-context variables necessary for the evaluation of the logic, A step 74 of formulating the execution logic for the operational-context variables.

Thus, on completion of the calculation, with an activation event received is associated a set of execution logic which may or may not be satisfied, as a function of the operational context of the PA. This result is subsequently implemented for the management of the piloting directives, or the management of the PA modes and laws, by means of the elementary cells 43 and 44 described previously.

Stated otherwise, the step of formulating execution logic consists in calculating, for a set of logic associated, in a database of binary parameters DB, with an activation event provided by the automatic piloting system, a boolean condition of satisfaction of the logic, by means of external-context or operational-context variables; the set of the execution logic associated with the activation event being able to be implemented for the management of the guidance directives and the management of the automatic guidance or piloting modes and law.

Advantageously, the step of managing the guidance directives consists in:

calculating a piloting or guidance directive value, by:

identifying a mathematical operation, described in the database DB, making it possible to calculate the value of the directive, identifying parameter values of the database DB necessary for the mathematical operation, formulating the value of the directive, by calculating by means of the mathematical operation, parameters of the operation and aircraft signals, evaluating piloting or guidance directive parameters as described in the database DB.

Advantageously, the step of managing the piloting or guidance laws and modes consists in:

identifying a guidance segment stimulated by an activation event according to an activation logic, identifying at least one piloting or guidance directive to be formulated, a guidance law to be activated, a piloting configuration to be applied, or an envelope protection to be activated.

The invention also pertains to a method for developing an automatic piloting system having the characteristics described above, and comprising in particular a step of defining a configuration domain DC, the said configuration domain DC being able by parameterization to cover a wide spectrum of operational needs of the automatic piloting system, and a step of programming and certifying several generic software engines.

The invention finally pertains to a method of maintenance of a system having the characteristics described above, and comprising a step of identifying a user logging on to the automatic piloting system, a step of loading a database of binary parameters DB for the parameterization of a generic software kernel, and a step of storage aboard the aircraft; the automatic piloting system being able in operational configuration to read the binary parameters of the database DB.

The invention claimed is:

1. An automatic piloting system for an aircraft comprising an aircraft signals acquisition module, a module for interfacing with the crew, and a module for processing output signals, comprising:
    a certified generic software kernel for automatic piloting aboard the aircraft, the certified generic software kernel comprising several certified parameterizable elementary cells,
    a parameterization tool for the certified generic software kernel, configured to transform an operational need of the automatic piloting system, expressed by means of a configuration file comprising a set of parameters structured in accordance with a predetermined configuration domain (DC), into a database of binary parameters (DB) for parameterizing the certified generic software kernel; each certified elementary cell being parameterized by the database (DB),
    means for loading and storage aboard the aircraft of the database (DB).

2. The automatic piloting system according to claim 1, wherein the configuration file describes an operational need in accordance with a configuration domain (DC), comprising a definition of the guidance modes; wherein each guidance mode is described by a list of parameters comprising at least one type of guidance mode, activation logic, an activation event, a guidance law, a guidance directive, or a piloting configuration; and wherein each parameter is associated with a range of permitted values.

3. The automatic piloting system according to claim 2, wherein the parameterization tool comprises a first module for verifying the configuration domain (DC) of a configuration file coded in marked-up text format, and a second module for converting the configuration file into the database (DB) configured to parameterize an automatic piloting system validated for the said configuration domain (DC).

4. The automatic piloting system according to claim 1, wherein the means for loading and storage comprise a device for identifying a user logging on to the automatic piloting system, a database loading device and a memory device for the storage of the database (DB).

5. The automatic piloting system according to claim 1, wherein the certified software kernel comprises at least five certified elementary cells:
    a first certified cell for formulating a set of external-context variables,
    a second certified cell for formulating a set of operational-context variables,
    a third certified cell for formulating execution logic for the automatic piloting system, at least as a function of an operational-context variable,
    a fourth certified cell for managing piloting or guidance directives provided by the pilot or the automatic piloting system,
    a fifth certified cell for managing piloting or guidance laws and modes of the automatic piloting system;
each of the certified elementary cells comprising a software engine parameterizable by the database (DB).

6. The automatic piloting system according to claim 5, wherein the certified software kernel further comprises a cell for managing the MIMI interface, configured to adapt the MMI interface at least as a function of an external-context or operational-context variable.

7. A method for developing an automatic piloting system for an aircraft according to claim 1, further comprising a step of defining a configuration domain (DC), the said configuration domain (DC) being configured by parameterization to cover a wide spectrum of operational needs of the automatic piloting system, and a step of programming and certifying several generic software engines.

8. A method of maintenance of a piloting system for an aircraft according to claim 1, further comprising a step of identifying a user logging on to the automatic piloting system, a step of loading a database of binary parameters (DB) for the parameterization of a generic software kernel, and a step of storage aboard the aircraft; the automatic piloting system being operationally configured to read the binary parameters of the database (DB).

9. The automatic piloting system according to claim 1, wherein the certified generic software kernel is isolated from the parameterization tool.

10. The automatic piloting system according to claim 1, wherein the certified generic software is certified by an organization, and
    wherein the certified generic software is only permitted, by the organization, to operate after successfully undergoing a certification process.

11. The automatic piloting system according to claim 10, wherein the parameterization tool is permitted, by the organization, to operate without requiring a certification process.

12. A method of automatic piloting aboard an aircraft comprising a step of acquiring aircraft signals, a step of interacting with the crew, and a step of processing output signals, further comprising certified calculation steps parameterized by means of a database of binary parameters (DB) for:
    Formulating an external context, by means of a set of variables representative of conditions exterior to the automatic piloting system, generated on the basis of the aircraft signals;
    Formulating an operational context, by means of a set of variables representative of operational conditions internal to the automatic piloting system, generated on the basis of aircraft signals or of external-context variables;
    Formulating execution logic for the automatic piloting system, by associating with an activation event, at least one external or operational context and an activation type;
    Managing piloting or guidance directives commanded by the pilot or calculated by the automatic piloting system on the basis of an activation event, for a given context;
    Managing piloting or guidance laws and modes, by means of a set of guidance segments which is associated with at least one activation logic, a piloting configuration, or a guidance dynamics.

13. The method of automatic piloting of an aircraft according to claim 12, wherein the external-context formulating step comprises the calculation steps including:
    Identifying external-context variables to be formulated, such as specified in the database (DB),
    For each external-context variable:
        Identifying a mathematical operation, specified in the database (DB) making it possible to formulate the external-context variable,
        Identifying values of aircraft signals necessary for the mathematical operation,
        Calculating the external-context variable, by means of the mathematical operation and of the values of aircraft signals.

14. The method of automatic piloting of an aircraft according to claim 12, wherein the operational-context formulating step comprises the calculation steps including:
    Identifying operational-context variables to be formulated, such as specified in the database (DB), For each operational-context variable:
- Identifying a mathematical operation, specified in the database (DB), making it possible to formulate the operational-context variable,
- Identifying values of external-context variables and of data of the internal state of the PA, which are necessary for the mathematical operation,
- Calculating the operational-context variable, by means of the mathematical operation and of the values of aircraft signals and external-context variables.

15. The method of automatic piloting of an aircraft according to claim 12, wherein the step of formulating execution logic comprises calculating, for a set of logic associated, in the database (DB), with an activation event provided by the automatic piloting system, a boolean condition of satisfaction of the logic, by means of external-context or operational-context variables; the set of the execution logic associated with the activation event being configured to manage the piloting or guidance directives and the piloting or guidance modes and laws.

16. The method of automatic piloting of an aircraft according to claim 12, wherein the step of managing the piloting or guidance directives comprises:
calculating a guidance directive value, by:
- identifying a mathematical operation, described in the database (DB), making it possible to calculate the value of the directive,
- identifying parameter values of the database (DB) necessary for the mathematical operation,
- formulating the value of the directive, by calculating by means of the mathematical operation, parameters of the operation and aircraft signals,
- evaluating guidance directive parameters as described in the database (DB).

17. The method of automatic piloting of an aircraft according to claim 12, wherein the step of managing the piloting or guidance laws and modes comprises:
- identifying a guidance segment stimulated by an activation event according to an activation logic,
- identifying at least one piloting or guidance directive to be formulated, a guidance law to be activated, a piloting configuration to be applied, or an envelope protection to be activated.

18. A program product comprising code instructions to perform the steps of the automatic piloting method according to claim 12.

* * * * *